US006553127B1

(12) United States Patent
Kurowski

(10) Patent No.: US 6,553,127 B1
(45) Date of Patent: Apr. 22, 2003

(54) METHOD AND APPARATUS FOR SELECTIVE BLOCK PROCESSING

(75) Inventor: Kordian Kurowski, San Jose, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/195,178

(22) Filed: Nov. 18, 1998

Related U.S. Application Data
(60) Provisional application No. 60/086,066, filed on May 20, 1998.

(51) Int. Cl.[7] .................................................. G06K 9/00
(52) U.S. Cl. ........................ 382/100; 713/176; 380/54
(58) Field of Search ........................... 380/54; 382/100, 382/112, 181; 707/10; 713/176

(56) References Cited

U.S. PATENT DOCUMENTS

| 5,530,759 | A | * | 6/1996 | Braudaway et al. .......... 380/54 |
| 5,659,613 | A | | 8/1997 | Copeland |
| 5,867,586 | A | * | 2/1999 | Liang .......................... 382/112 |
| 5,915,027 | A | * | 6/1999 | Cox et al. ..................... 380/54 |
| 5,930,369 | A | * | 7/1999 | Cox et al. ..................... 380/54 |
| 5,960,081 | A | * | 9/1999 | Vynne et al. ................ 713/176 |
| 6,049,627 | A | * | 4/2000 | Becker et al. ............... 382/181 |
| 6,163,842 | A | * | 12/2000 | Barton ......................... 713/176 |
| 6,208,745 | B1 | * | 3/2001 | Florencio et al. ........... 382/100 |

FOREIGN PATENT DOCUMENTS

| EP | 0 840513 | 5/1998 |
| WO | WO 96 25005 | 8/1996 |

OTHER PUBLICATIONS

Holliman, et al "Adaptive Public Watermarking of DCT–Based Compressed Images" Storage and Retrival for Image and Video Databases vol 3312, p. 28–30 Jan. 1998 Proceedings of the SPIE—The International Society for Optical Engineering, 1997 SPIE–Int OPT Eng. USA.

Nikolaidis N et al: Copyright Protection of Images Using Robust Digital Signatures 1996 IEEE Internationl Conference on Acoustics, Speech and Signal Process May 7–10, 1996; vol. 4 No. Conf. 21 May 7, 1996 pp. 2168–2171 Institute of Electrical and Electronics Engineers.

Tae–Yun Chung et al: "Digital Watermarking for Copyright Protection MPEG2 Cmopressed Video" 1998 International Conference on Consumer Electronic, Los Angeles, CA USA Jun. 2–4, 1998. Vol. 44 No. 3 pp. 895–901 IEEE Transactions of Consumer Electronic, Aug. 1998 IEEE, ISSN 0098–3063.

Nikolaidis N et al: "Robust Image Watermarking in the Spatial Domain" Singal Processing European Journal Devoted to the Methods and Applications of Signal Processing vol. 66 No. 2 May 28, 1998, pp. 385–403.

Huang J et al: Adaptive Image Watermarking Scheme Based on Bisual Masking Electronics Letters, vol. 34, No. 8, Apr. 16, 1998; 748–750.

\* cited by examiner

Primary Examiner—Yon J. Couso
Assistant Examiner—M B Choobin
(74) Attorney, Agent, or Firm—George Almeida

(57) ABSTRACT

Methods, devices and systems for embedding and detecting a watermark in a data stream, such as a video stream. A texture criterion is evaluated for each block of the data stream. The texture criterion measures a variation of selected characteristics associated with each element of the data stream, such as luminance and chrominance. Only those blocks that are determined to have at least a predetermined degree of variation in the selected characteristic are selected for embedding of a watermark. By providing the watermark detector with a block selector that evaluates the same texture criterion as was employed in the watermark embedder, the detector attempts detection of the watermark only in those blocks having been determined to have the predetermined degree of variation of the selected characteristic, or greater. By attempting detection only in such blocks, the number of detection computations is decreased and the watermark signal to data stream noise ratio is increased, thereby facilitating detection of even weak watermarks.

26 Claims, 3 Drawing Sheets

METHOD AND APPARATUS FOR SELECTIVE BLOCK PROCESSING

This application claims the benefit of Provisional Application No. 60/086,666, May 20, 1998.

BACKGROUND OF THE INVENTION

1. Field of the Invention

This invention relates generally to the field of steganography. More particularly, the present invention relates to the embedding and detection of watermark data in a data stream such as, for example, a video stream.

2. Description of the Related Art

The synergies between recently developed data compression techniques, high capacity storage media, the internet and other high bandwidth distribution channels have rendered digital media nearly ubiquitous. In view of these developments, technologies for the control of distribution, copying and identification of authorship and/or ownership of such media are gaining importance and relevance in the marketplace. In particular, the effective enforcement of copyrights in digital media is a complex problem, primarily due to the nature of the media itself. Indeed, unless preventative measures are taken, digital data is easily and perfectly reproducible, with no loss of fidelity.

So-called "digital watermarks" have gained attention recently as one possible weapon in a content developer's arsenal to combat piracy or unauthorized distribution or reproduction of digital media, such as video. In general, watermarks are a message, symbol or any distinctive marking that is transparently added to the video signal for the purpose of identifying whether the copy is an authorized one, the author of the video content, its distributor, owner or like information. The process of adding the distinctive message, symbol or marking to the digital media is generally referred to as the embedding process. Preferably, digital watermarks are embedded in the digital media (whether audio, still pictures or video) so as to render them invisible to the intended audience (such as, for example, moviegoers) and reliably detectable by appropriate detection systems. In general, visibility and detectability are directly related to one another: the more visible a watermark is, the more reliably it will be detected. Conversely, a well-concealed watermark may be difficult to reliably detect. An acceptable compromise between visibility and detectability, therefore, must typically be reached.

Several methods have been proposed to embed a watermark in a data stream. In the case of a video stream, for example, each video frame may be divided into a plurality of blocks of a given size. Each block, therefore, consists of a matrix of picture elements (hereafter, pixels), each having a number of characteristics associated therewith, such as luminance, chrominance etc. A transformation may be carried out for each pixel of each block. For example, a Discrete Cosine Transform (hereafter, DCT), a Discrete Fourier Transform (hereafter, DFT) or some other transformation may be carried out for each pixel of each block of each frame of the video stream. Such transformations produce a single cosine or sinusoid coefficient for each pixel, and give information related to the spectral content of the video stream. Once this information is obtained, a watermark or a portion thereof may be embedded in one or more blocks by evaluating and selectively modifying the coefficients of the transformed blocks of pixels. For example, a watermark or a portion thereof may be embedded as perturbations in the coefficients of single or a plurality of blocks. By selectively shifting the coefficients of matrices of DCT or DFT coefficients, for example, a watermark may be embedded with low visibility. This is possible, because the human visual and auditory systems do not readily distinguish between small variations in spectral content, making it possible for video information of a given frequency to mask watermark data of the same or an adjacent frequency.

Conventional methods relying on the transformation of each pixel of each block to determine their spectral content suffer from a number of disadvantages. Indeed, processing a large number of blocks, each of which may contain, for example, a matrix of 8×8 pixels, or 16×16 pixels is a highly computationally intensive process. Such brute force processing of each pixel in each block of each frame is very demanding in terms of computational resources, time and cost. Such a scheme, to operate efficiently, requires costly dedicated hardware and substantial memory resources to keep pace with the high data rates of, for example, digital video. These problems are exacerbated on the detection side. Watermark detectors are typically deployed within consumer electronics, such as, for example, Digital Video (or Versatile) Disks (hereafter, DVD). Therefore, to reliably and accurately (low number of false positive watermark identifications) detect the watermarks using conventional schemes, each pixel of each block must be transformed into the frequency domain, and the obtained frequency coefficients evaluated for possible shifts indicative of a portion of a watermark. To gain widespread acceptance in the marketplace, however, the detection system must meet a number of criteria, including simplicity, reliability and low cost, so that it may be inexpensively incorporated in a variety of mass-market consumer electronics devices, such as DVD systems. These criteria appear to be at odds with a detection system requiring the transformation and testing of each pixel of each block of each frame of the entire data stream.

What are needed, therefore, are devices and methods for simply and reliably embedding and detecting watermarks or other similar hidden messages or symbols in digital data sets or data streams. Such a watermark embedding and detecting devices and methods should also be inexpensive to implement and to deploy in a wide array of devices, such as home consumer electronics devices, for example. What are also needed are devices and methods that reduce the number of operations required to invisibly embed and reliably detect watermarks or other similar hidden data in digital media. Preferably, such devices and methods would be compatible with a great variety of watermark embedding and detecting methods, including conventional frequency domain-centered embedding and detection schemes. Also, such watermark embedding and detecting devices and methods should decrease the time and number of computations necessary to process the data stream, as compared to conventional devices and methods.

SUMMARY OF THE INVENTION

It is, therefore, an object of the present invention to provide devices and methods for simply and reliably embedding and detecting watermarks or other similar hidden messages or symbols in digital data streams. It is another object of the present invention to provide watermark embedding and detecting devices and methods that are inexpensive to implement and to deploy in a wide array of devices. A further object is to provide devices and methods that reduce the number of operations required to invisibly embed and reliably detect watermarks or other similar hidden data in digital media. Another object is to provide such devices and methods that are compatible with a great variety of watermark embedding and detecting methods. A still further object is to provide devices and methods for embedding and detecting watermarks that decrease the time and number of computations necessary to process a given number of blocks, as compared to conventional devices and methods.

In accordance with the above-described objects and those that will be mentioned and will become apparent below, a watermark processing method, according to an embodiment of the present invention, comprises the steps of:

dividing a source data set into at least one block, each element of the source data set having at least one characteristic associated therewith;

testing each block to determine whether selected elements of each block exhibit at least a pre-selected degree of variation of at least one selected characteristic; and processing a watermark only in those blocks that exhibit at least the pre-selected degree of variation of the selected characteristic.

According to other embodiments, the testing step may include a step of comparing the degree of variation of the selected characteristic with a threshold value. The testing step may include a step of subtracting a maximum value of the selected characteristic of the selected elements from a minimum value of the selected characteristic of the selected elements, the absolute value of the result being compared with the threshold value. The testing step may include a step of generating a sum of absolute values of differences of the selected characteristic of the selected elements, the sum of differences being compared with the threshold value. The source data set may include video and/or other types of data. The selected characteristic may include one or more characteristics selected from the group consisting of luminance, chrominance and RGB. The measure of variation may be determined in a pixel domain. The dividing step may divide the source data set into a plurality of equally sized blocks, each block including a matrix of data set elements having a size of at least 2×1 elements. The data set elements may include picture elements (pixels). The processing step may include a step of embedding the watermark in each block of the data set that exhibits at least the pre-selected degree of variation of the at least one selected characteristic. The processing step may include a step of detecting the watermark only in those blocks of the data set that exhibit at least the pre-selected degree of variation of selected characteristic or characteristics. A step of de-emphasizing variations of the selected characteristic or characteristics along edges of each block relative to variations of the selected characteristic or characteristics within an interior of each block may be carried out. The de-emphasizing step may include a step of assigning a weighting coefficient to each element within each block, elements along edges of each block being assigned a lower coefficient than elements within an interior of each block.

The present invention may also be viewed as a device to embed a watermark in a data stream, the data stream including a plurality of data elements, each element having at least one characteristic associated therewith, comprising:

means for buffering and dividing the data stream into at least one block;

means for selecting blocks according to a texture criterion that measures a variation of a selected characteristic associated with each data element of the data stream, means for embedding the watermark only in selected blocks.

According to further embodiments, the texture criterion may include at least one measure of variation of the characteristic or characteristics of selected elements of the data stream. The selecting means may evaluate the texture criterion in a spatial domain. The buffering and dividing means and the selecting means each may provide blocks to the embedding means, the embedding means being selectively disabled and enabled based upon an output of the selecting means. The buffering and dividing means may be connected to a first input of a logic device and to an input of the block selecting means, the block selecting means being connected to the embedding means whose output is connected to a second input of the logic device, the block selecting means controlling an operation of the logic device to cause the logic device to selectively output blocks with and without watermarks. The logic device may include a multiplexer. The selecting means may output a texture value to the embedding means, the embedding means modulating a strength of the watermark depending upon the magnitude of the texture value.

According to another embodiment, a device to detect a watermark in a data stream, the data stream including a plurality of data elements, each element having at least one characteristic associated therewith, according to the present invention comprises:

means for buffering and dividing the data stream into at least one block;

means for selecting blocks according to a texture criterion that measures a variation of a selected characteristic associated with each data element of the data stream, means for detecting the watermark only in selected blocks.

According to still further embodiments, the texture criterion may include at least one measure of variation of the characteristic or characteristics of selected elements of the data stream. The selecting means may evaluate the texture criterion in a spatial domain. The detecting means may be selectively disabled and enabled depending upon an output of the selecting means. The texture criterion is preferably the same criterion that is used to select blocks in which to embed the watermark during a watermark embedding process. The selecting means may be the same selecting means that is used to select blocks in which to embed the watermark during an embedding process.

Another embodiment of the present invention is a watermark-based method of validating a data stream, comprising the steps of:

embedding a watermark only in portions of the data stream whose spectral energy exceeds a predetermined threshold according to a texture criterion, to create a watermarked data stream;

providing recording data stream playback devices with a selector configured to evaluate the texture criterion and to select only those portions of the data stream whose spectral energy exceeds the predetermined threshold; and detecting the watermark only in the selected portions of the data stream.

According to other preferred embodiments, the data stream may include a video stream. A step of validating the data stream only when a watermark is detected in the data stream may also be carried out. A step of disallowing playback of the video stream when the data stream in not validated may also be carried out.

A still further embodiment of the present invention is a method of detecting a watermark in a watermarked data stream generated by a watermark embedding process, comprising the steps of:

dividing the data stream into a plurality of equally sized blocks;

selecting only those blocks likely to include a watermark using a same criterion as was used in the watermark embedding process;

accumulating the selected blocks in a spatial domain to reinforce the watermark, if present, relative to a relatively uncorrelated data stream.

BRIEF DESCRIPTION OF THE DRAWINGS

For a further understanding of the objects and advantages of the present invention reference should be made to the following detailed description, taken in conjunction with the accompanying figures, in which.

DESCRIPTION OF THE PREFERRED EMBODIMENTS

Figure 1:
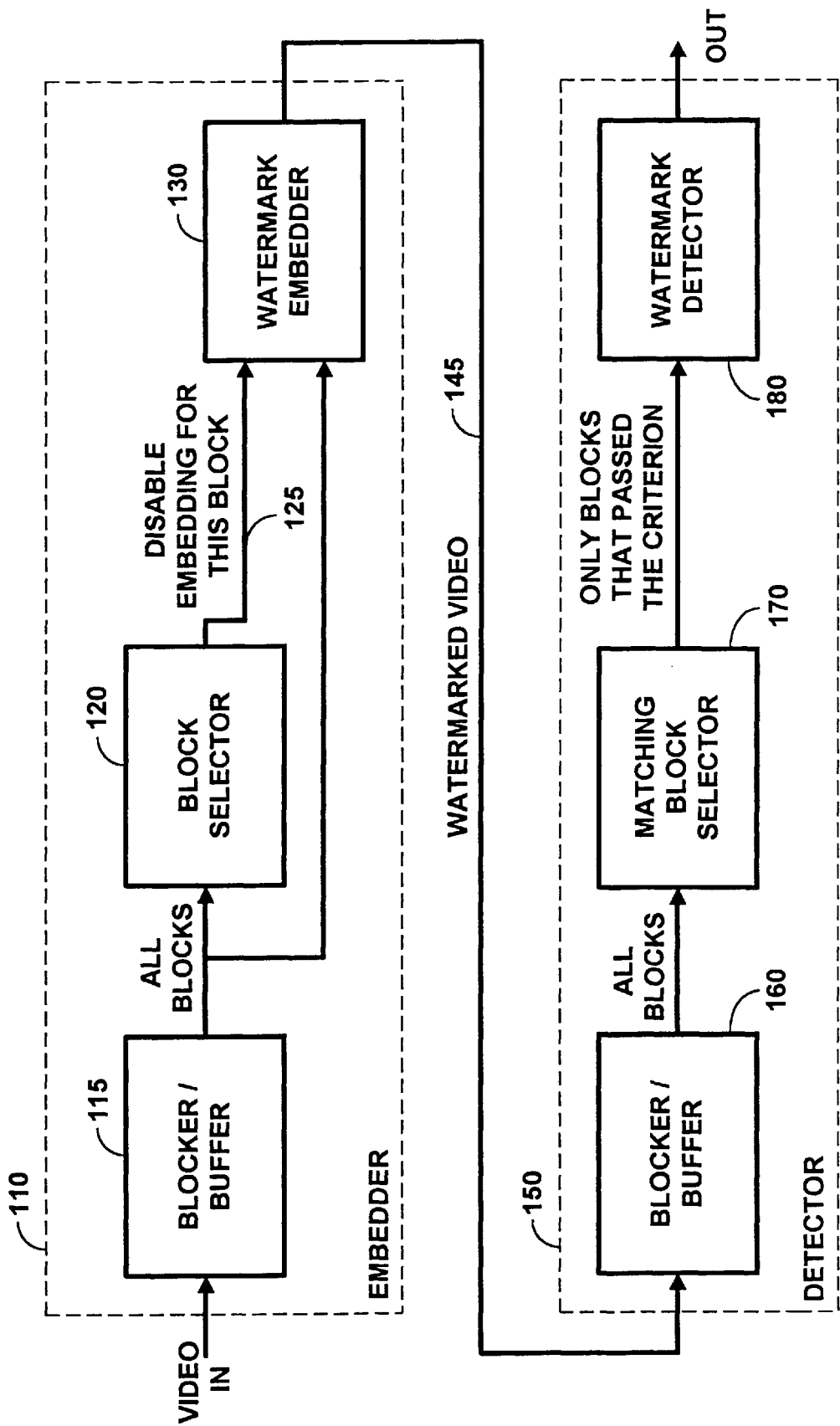
FIG. 1 is a block diagram of an embodiment of the selective block processing system according to the present invention.

A system for selective block processing according to an embodiment of the present invention will now be described with reference to FIG. 1. Reference numeral 110 designates a watermark embedder, a functional block that inserts a watermark in a data set or a data stream. Within the context of the present invention, the term watermark includes denotes any intentionally concealed message, symbol or other artifact that conveys some information such as, for example, indicia of ownership or authorship and that is designed to be substantially invisibly hidden into the data stream. The data set or data stream may include, for example, a video signal, a still picture data and/or audio data.

Likewise, reference numeral 150 denotes a watermark detector, a functional block that detects the watermark or watermarks hidden in the data set or the data stream. For ease of description of the present invention, the embedder and the detector in FIG. 1 are connected by a communication channel 145 labeled "watermarked video", although video is but one application of the present invention. Moreover, in practice, the communication channel 145 may be a distribution medium such as a wireless communication channel, a wired communication channel such as coaxial cable, the Internet, telephone lines and the like. Alternatively, reference numeral 145 may designate a data carrier such as, for example, magnetic tape, a DVD disk, a CD-ROM, a videodisk or any other magnetic, optical or hybrid data storage device. The embedder 110 may be located at a manufacturing or distribution facility, whereas the detector may be disposed within consumer playback devices, such as DVD players etc. For example, the embedder 110 may embed watermark data in a video stream and encode a DVD disk with the watermark-embedded video stream. The DVD disk may then be purchased or rented by a consumer for later playback on a playback device equipped with a suitable detector, such as detector 150.

Referring first to the embedder 110, numeral 115 represents a blocker/buffer. The blocker/buffer 115 buffers a source data set (a video data stream, for example) in an internal memory thereof and divides the buffered incoming stream into a plurality of equally sized blocks. Although a video data stream is used for purposes of illustration, it is to be understood that the present invention is not to be limited thereto. The blocks each include a matrix of data set elements, Each of the data set elements includes, in the case of video data, a pixel having at least one characteristic associated therewith, such as luminance and/or chrominance. The blocks may be as small as 2×1 pixels, up to an entire frame of video data. For example, each block may include a matrix of 8×8 pixels or may include a matrix of 16×16 pixels. The matrices of data set elements need not have the same number of rows as the number of columns.

The output of the blocker/buffer 115 is then a serial stream of equally sized blocks that are sent to a block selector 120. The block selector 120 tests each incoming block to determine whether a predetermined criterion is satisfied. If the criterion is not satisfied, the block selector 120 sends a signal 125 to the watermark embedder 130, disabling the embedding of the watermark in the block that did not satisfy the criterion. For example, the block selector 120 may evaluate a "texture" criterion for each block and output a texture value where 0 (zero) indicates a completely flat, featureless and relatively unchanging field within a block and where higher numbers indicate increasing spectral content. The output of the blocker/buffer 115 is also sent to the watermark embedder 130. Therefore, the watermark embedder 130, according to the embodiment shown in FIG. 1, receives each block output from the blocker/buffer 115. As long as the block selector 120 does not generate the signal 125 disabling the embedding of the watermark, a watermark is embedded in each and every block. However, should any block fail to satisfy the criterion, the block selector 120 will disable the embedding of a watermark for that block by outputting a low unsigned value to the watermark detector 130, the watermark detector 130 being configured to embed a watermark in the current block only when the value generated by the block selector 120 exceeds a predetermined threshold value.

Alternatively, the watermark embedder 130 may receive a texture value from the block selector 120, and modulate the strength of the embedded watermark based upon the magnitude of the received texture value. In this case, a 0 texture value would cause the watermark embedder 130 to embed a watermark having zero strength, in effect not embedding a watermark at all. Higher texture values, according to this embodiment, would cause the watermark embedder 130 to embed watermarks having progressively stronger watermarks.

Figure 3:
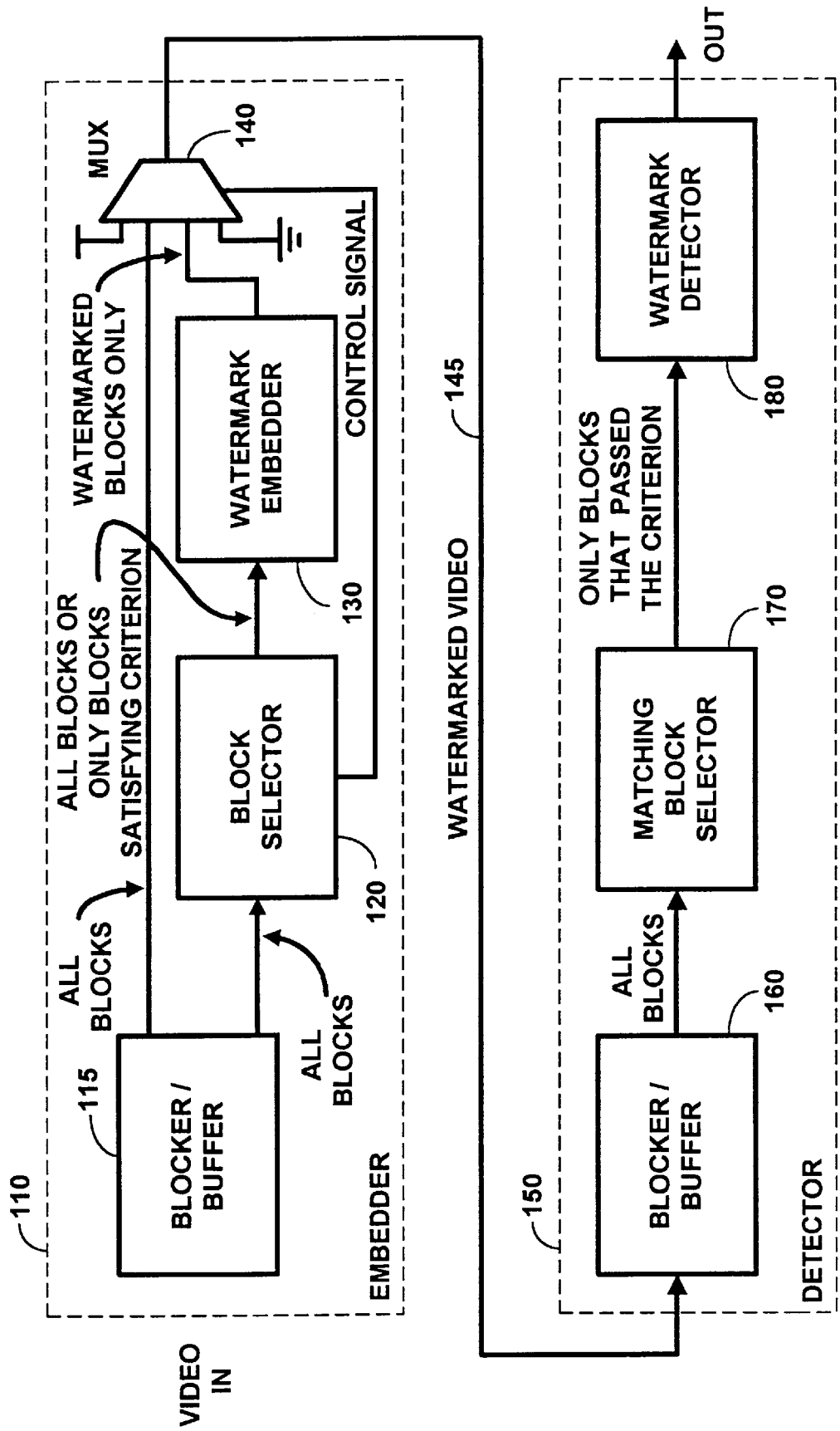
FIG. 3 is a block diagram of another embodiment of the selective block processing system according to the present invention.

Still further embodiments of the embedder 110 are possible. For example, as shown in FIG. 3, instead of the block selector 120 generating a disable signal to the watermark embedder 130 as shown in FIG. 1, the block selector 120 of FIG. 3 generates a select control signal to a logic device, such as a 2:1 multiplexer 140. One input to the multiplexer 140 originates from the blocker/buffer 115 and the other input of the multiplexer 140 originates from the watermark embedder 130. According to this embodiment, the block selector 120 forwards only those blocks that satisfy the criterion (or only those blocks that do not satisfy the criterion, depending upon how the criterion is defined) to the watermark embedder 130. Alternatively, the block selector 120 may forward all block to the watermark embedder 130, the watermark embedder 130 then embedding a watermark in each and every block. Computationally, however, it is more economical for the block selector 120 to decimate the number of blocks it sends to the watermark embedder by forwarding thereto only those blocks that satisfy the criterion. Depending then on the state (0 or 1) of the control signal generated by the block selector 120, multiplexer 140 will output a block having a watermark embedded therein or a block without a watermark embedded therein. Other implementations of the embedder 110 are possible, and all such implementations should be considered to fall within the scope of the present invention.

The block selector 120 tests each incoming block to determine whether the block satisfies a predetermined criterion. As alluded to above, one such criterion, according to the present invention, is a so-called "texture" criterion. Generally, the texture may be defined as the degree of variation of any characteristic or characteristics associated with constituent elements of a data set, such as pixels in a video stream. In the case of a video stream, the texture criterion is a measure of the variation (or lack thereof), within each block, of one or more characteristics associated with each pixel or with selected pixels within each block or selected blocks. For example, the texture criterion may determine the variation of the luminance characteristic of selected pixels within a block, the variation of the chrominance characteristic of selected pixels within a block, the variation of both luminance and chrominance and/or other characteristics.

In general, the texture criterion may be thought of as a measure of the variation of one or more characteristics of selected pixels within a block. For example, blocks including pixels representing a featureless or near featureless blue sky likely would not satisfy the texture criterion, and a watermark would not, according to the present invention, be embedded in those blocks. Indeed, if a watermark were to be embedded in blocks whose constituent pixels represent a near featureless sky, for example, the probability that the embedded watermark would be visible increases. This would constitute an unacceptable degradation in the apparent picture quality, in the case of a video stream. On the other hand, if the luminance characteristic, for example, varies greatly for the selected pixels within a block, a watermark may be embedded with good results, meaning that such an embedded watermark will probably not be visible. By only embedding a watermark in those blocks having a spectral content that is about equal to the mean spectral content of the watermark, for example, the watermark may be embedded with low visibility and acceptable detectability, as the human visual system does not readily discern small changes within images having high spectral energy.

For example, a 16×16 pixel block that does not satisfy the texture criterion for the luminance characteristic may be defined as a block in which the magnitude of the 256 luminance values are around the same value, or as a block in which the magnitude of the luminance values of selected pixels within the 256 pixels of the block are around the same value. This may be quantized by placing a value on the degree of variation of the luminance values of the selected pixels of the block. For example, the texture criterion may be satisfied, according to one embodiment of the present invention, when the maximum luminance value of the selected pixels exceeds the minimum luminance value by more than a predetermined threshold value. This threshold value may be constant and predetermined or may be adaptive. Returning now to FIGS. 1 and 3, the block selector 120 may determine that pixel among the selected pixels of the block that has the greatest luminance value and determine that pixel among the selected pixels that has the smallest luminance value. The maximum and minimum luminance values may then be subtracted from one another, the sign stripped, leaving only the magnitude, and the result compared with a predetermined constant or adaptive threshold. If the result is greater than (or greater than or equal to) the threshold value, the texture criterion is deemed to have been satisfied for that block and the block selector will enable embedding for that block (FIG. 1) or control the multiplexer 140 to output a watermarked block output from the blocker/buffer 115 (FIG. 3).

Another, finer grained method of determining the texture criterion is to generate a sum of absolute values of differences of the selected characteristic of the selected pixels, a result of this sum of absolute value differences then being compared with a predetermined constant or adaptive threshold value. This is believed to yield a more accurate measure of the texture of the selected characteristic, particularly for larger-sized blocks. For example, the texture criterion may be defined as follows:

$$|Pa-Pb|+|Pc-Pd|+|Pe-Pf|+ \ldots +|Pm-Pn|<K$$

wherein Pa, Pb, Pc, Pd . . . Pm and Pn are values of the selected pixels within the block and wherein K is a predetermined constant or adaptive threshold value. The absolute values insure that the polarity of the result of the differences do not affect the final result. In other words, the phase of the individual differences is immaterial for the purpose of evaluating the texture criterion. In selecting the pixels within the block on which to perform the difference operations, some pixel pairs work better than others do. For example, difference pairs may be chosen with a certain spacing to represent frequencies that best mask the watermark. The spacing preferably should be sufficient to insure that the values of the selected characteristic (luminance, chrominance, etc.) survive manipulations, such as digital to analog conversions, cropping, stretching and the like. Such manipulations may be malevolent or may be incident to normal use. For example, if the video stream (145 in FIG. 1) were to be recorded on an analog medium, such as a videocassette recorder (hereafter, VCR) tape, the detectability of the watermark would suffer if the selected pixels were horizontally adjacent or spatially too close to one another. This is because conventional VCRs act as a low pass filters, somewhat attenuating high frequency content. By carefully selecting the pixels to use in the evaluation of the texture criterion to insure that such frequencies are not unacceptably attenuated, the watermark stands a greater chance of surviving such conversion processes with acceptable detectability. The separation between selected pixels; their location and/or pattern may be selected a priori from representative samples of video clips, for example, so that the selected pixels work best with those representative samples. The block selection criterion, moreover, is preferably chosen so that the blocks selected for embedding do not bias the subsequent watermark detection. For example, in an incorrect implementation, if only blocks having a frequency content similar to that of the watermark were to be selected by the selection criterion, video blocks that do not contain a watermark could resemble video blocks that do, in fact, contain a watermark. To avoid this, the video content of each block preferably should remain uncorrelated to the watermark during all of the steps of the block selection process.

According to an embodiment of the present invention, the watermark is only embedded in those blocks that satisfy the texture criterion. The blocks that do not satisfy the texture criterion; that is, those blocks that exhibit little variation in terms of, for example, luminance or chrominance, do not receive a watermark, or receive a weak watermark. According to a preferred embodiment of the present invention, the entire watermark is included or none of the watermark is included in a given block, as opposed to some conventional techniques wherein a single watermark may be distributed across many blocks, each DCT or DFT coefficient of the watermark being turned off and on depending upon the frequency content of each coefficient. In contrast, according to the present invention, only those blocks that are best able to hide the watermark do, in fact, receive the watermark. The practical effect of the present invention is to greatly increase the signal to noise ratio $S_W/N_V$, where $S_W$ is the strength of the watermark and $N_V$ is the strength of the uncorrelated video stream. Increasing the signal to noise ratio $S_W/N_V$ greatly facilitates the detection of the correlated watermark signal with respect to the uncorrelated video content, if only those blocks that contain a watermark are presented to the watermark detector 180. How this is done, according to the present invention, is shown in the detector 150 of FIGS. 1 and 3.

As shown in FIGS. 1 and 3, the detector 150 includes at least three main functional blocks. A blocker/buffer 160 buffers the incoming watermarked video stream 145 and divides the stream into a series of blocks, matched in size to those generated by the blocker/buffer 115 of the embedder 110. The blocker/buffer 160 of the detector 150 may be identical to the blocker/buffer 115 of the embedder 110. The block selector 170 is preferably matched to the block selector 120 of the embedder 110. The matching block selector 170 applies the same criterion to the blocks generated by the blocker/buffer 160 as the block selector 120 applies to the blocks generated by the blocker/buffer 115 of the embedder 110. In this manner, the criterion for embedding and the criterion for detecting are identical. By virtue of this identity of criteria utilized by the embedder 110 and the detector 150, the watermark detector 180 only receives those blocks that the matching block detector 170 has determined are likely candidates for containing watermarks. Under perfect conditions (the embedder output is equal to the detector input and no intervening video processing has occurred), the matching block selector 170 will select all or nearly all of the same blocks for watermark detection that the block selector 120 has selected for watermark embedding. In one preferred embodiment, therefore, the matching block detector 170 filters the incoming blocks and passes to the watermark detector 180 only those blocks likely to contain a watermark. The matching block detector 170 thus decimates the incoming blocks according to the selected criterion and does not present the watermark detector with a great many blocks that do not contain watermarks. Indeed, if a texture criterion is used, the matching block detector 170 would not permit blocks having a low degree of texture to reach the watermark detector 180. This detection method is particularly advantageous when combined with, for example, spatial accumulation according to the present invention. When video processing has occurred at some point in the communication channel 145 of FIG. 1, the threshold value for the selection criterion in the detector 150 may be set to a different value than the threshold value for the same criterion in the embedder 110. For example, if the signal in the channel 145 is attenuated, smeared, sharpened or otherwise changed, the detector threshold value may be lowered or raised for best results.

In the case of accumulation in the spatial, or pixel domain (as opposed to accumulation in the frequency domain after a DFT or DCT transformation), the blocks may be added together and then divided by the number of accumulated blocks. Accumulation of 16×16 blocks, for example, is done by taking the average of all of the top, left hand corner pixels of each block, then by taking the average of the next pixel in each block and so on until all 256 pixels of each 16×16 block have been averaged. If a conventional watermark detector were to attempt detection on each block of the entire watermarked video stream, the signal to noise ratio $S_W/N_V$ would be quite low, rendering detection difficult and less reliable. This is because the many blocks that do not contain a watermark are averaged in with the blocks containing a watermark, weakening the relative strength of the correlated watermark relative to the uncorrelated video signal. On the other hand, according to the present invention, the watermark detector 180 only receives blocks that are likely to contain a watermark. Since the watermark pattern repeats modulo the block size and the video signal is uncorrelated, the watermark stands out and may readily be recognized and detected. Therefore, the matching block selector 170 and the watermark detector 180 work in concert to increase the $S_W/N_V$ by supplying the watermark detector only with blocks likely to contain a watermark, rendering detection less susceptible to false positive identifications, for example.

If all blocks of a given blocked video stream were to have a watermark embedded therein, it is highly probable that image quality would be substantially degraded, and the watermark would then be highly visible. In that case, however, detection by spatial domain accumulation would be undeniably facilitated, as the watermark would be reinforced in every block. Although not every block is provided with a watermark, according to the present invention, each block input to the watermark detector 180 is highly likely to contain a watermark, as the criterion is used in the matching block selector 170 is identical to the criterion used in the block selector 120, and as the matching block selector only forwards those blocks to the watermark detector that are likely to contain a watermark. From the perspective of the watermark detector 180, therefore, nearly every block of the video stream appearing at its input contains a watermark. This method, therefore, enjoys all of the advantages of embedding a watermark in each block of the video stream, but suffers none of the aforementioned visibility drawbacks. Moreover, such spatial accumulation avoids the time consuming and computationally intensive frequency domain transformations characterizing a great many conventional embedding and detection schemes. Although particularly advantageous, the applicability of the present invention is not limited by spatial or pixel domain accumulation detection methods. Indeed, the selective block processing devices and methods described herein are equally applicable to watermark embedding and detecting schemes that require transforming the source data set (for example, a video stream) into the frequency domain. Indeed, the selective block processing devices and methods according to the present invention are believed to be generic to the embedding and detecting method employed. However, it is believed to be advantageous to accumulate the incoming blocks in the spatial domain without preliminary transformations, as video data is typically initially presented to the embedder 110 and to the detector 150 in the spatial domain.

There are situations wherein a block might satisfy the texture criterion and yet be unsuitable as a block in which to embed a watermark. Indeed, such a block may have been determined, using the methods disclosed herein, to have sufficiently high frequency content to warrant the embedding of a watermark, yet be unsuitable for such a purpose. For example, the block might include within its borders and along one of its sides a high contrast feature such as, for example, a fence post or an edge thereof against a featureless sky. Although the evaluation of the texture criterion may trigger the inclusion of a watermark, the embedding thereof might result in visible artifacts in the embedded block, which might manifest themselves as a "ghosting" phenomenon upon playback.

To address this issue and to decrease the probability that such inappropriate blocks will be selected for inclusion of a watermark, the block selector 120 of the embedder 110 may employ a weighting scheme wherein the selected characteristics of the selected pixels toward the center of the block are assigned a higher weight coefficient than the selected characteristics of the selected pixels at or toward the edge of the block. For example, the selected characteristics of the selected pixels at the edge of the block may be ignored or de-emphasized by giving them a low weighting coefficient relative to the selected characteristics of the selected pixels at or toward the center of the block. Such weighting allows the block selector 120 to disable the watermark embedder 130, even in blocks that might have triggered the embedding of the watermark had weighting not been used. The weighting coefficients may, for example, exhibit a linear variation from the edge of a block to the center thereof, or any other variation, including, for example, weighting pixels at the edge (top, bottom and sides of block) with a zero coefficient and weighting all other pixels of the block with a unity coefficient. In the latter case, the selected characteristic(s) of the selected pixels at the edge of the block would be completely ignored.

Figure 2:
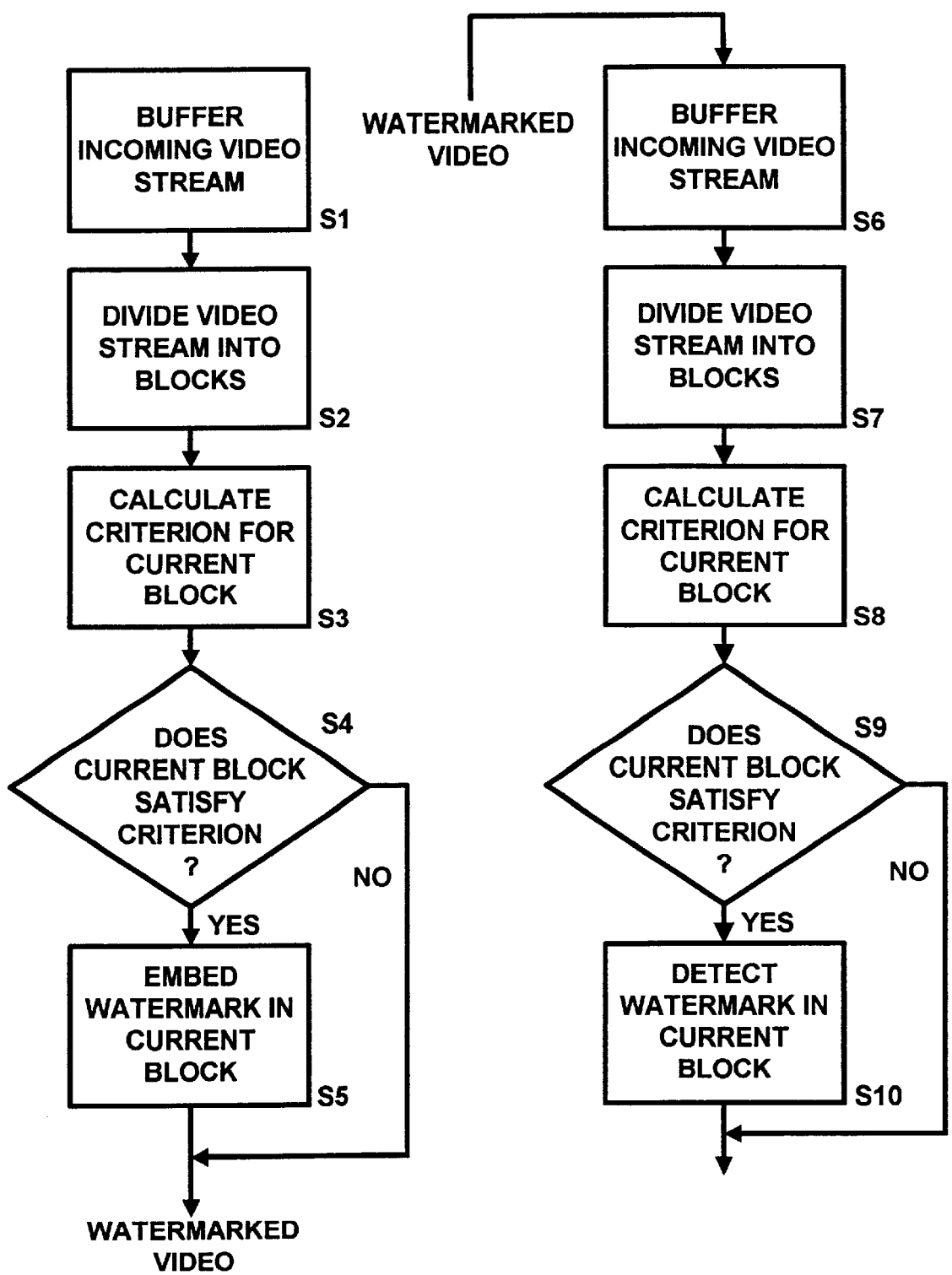
FIG. 2 is a flow chart of an embodiment of the selective block processing method according to the present invention.

FIG. 2 shows a flow chart of an embodiment of the selective block processing method according to the present invention. As shown in FIG. 2, an incoming video stream (or other data stream) is buffered in step S1. In step S2, the buffered video stream is divided into a plurality of equally sized blocks. A criterion, such as the texture criterion described herein, is calculated for each block in step S3. For each block, it is then determined whether the criterion is satisfied, as shown in step S4. If the texture criterion is satisfied, an entire watermark is embedded in the current block, as shown in step S5. If the texture criterion is not satisfied, then the current block under evaluation is determined to be an unsuitable candidate for embedding of a watermark and step S5 is bypassed. Thereafter, the watermarked video stream may be recorded on a recording medium or data carrier, or transmitted over a transmission channel.

Steps S6 through S10 may be carried out within, for example, a video stream playback device, for example. In step S6, the watermarked video stream is read from the recording medium or data carrier or received from the transmission channel and buffered. In step S7, the buffered watermarked video stream is divided in a plurality of equally sized blocks, preferably of the same size (8×8 pixel blocks, 16×16-pixel blocks etc.) as in step S2. The same criterion is calculated for the current block of the blocked video stream in step S8 as was calculated in step S3. Calculating the same criterion in step S3 and step S8 minimizes the number of watermark detection steps in step S10. In step S9, it is determined whether the current block satisfies the criterion, such as the texture criterion disclosed herein. If the criterion is satisfied—that is, if the evaluation of the texture criterion indicates a frequency content for the current block that is higher than the predetermined threshold, the detection step shown at S10 is carried out for that block. Otherwise, the detection step of S10 is bypassed. The detection step shown at S10 is preferably carried out by accumulation in the spatial, or pixel domain, as disclosed above.

A validation process may optionally be carried out, depending upon the results of the detection steps. For example, when a watermark is detected, recording of the video stream may be prevented. Moreover, removal of the watermark is a difficult task that often cannot be carried out without unduly degrading the quality of the video content, which constitutes a further disincentive to copying the video content. Alternatively, the video stream playback device may refuse to replay the video stream if the video stream is not validated (e.g., no watermark or tampered watermark present), or some other action may be taken to deter tampering, such as an intentional degradation of the playback quality.

According to the present invention, a very weak watermark may be inserted in selected blocks of a data stream, such as a video stream, for example, thereby further reducing visibility of the watermark with little effect on its detectability. The strength of the embedded watermark may be modulated by the texture value output from the block selector 120. Moreover, as the matching block selector 170 in the detector 150 "knows" which blocks should contain a watermark, for example, it is able to look only at those blocks and average them so the relatively strongly correlated (albeit weak) watermark stands out from the uncorrelated video stream. The matching block selector 170 in the detector 150 "knows" which blocks should contain a watermark, because it is configured to evaluate the same criterion (e.g., the texture criterion) as its counterpart block selector 120 in the embedder 110. Therefore, the present invention allows good detectability of a weak embedded signal, thus enjoying the low visibility and high detectability features of a good watermark.

While the foregoing detailed description has described preferred embodiments of the present invention, it is to be understood that the above description is illustrative only and not limiting of the disclosed invention. For example, the present invention is equally applicable to watermark embedding processes wherein the watermark is added, subtracted, multiplied, etc. into to a data set, such as a video stream, audio, single-frame pictures and other data where a small degree of error introduced into each byte does not compromise the usability of the data. Moreover, the watermark may be embedded and/or detected in the spatial or frequency domain, using DCT, DFT, fixed or random noise patterns, patches etc. Indeed, the present invention is not to be limited to, for example, averaging or accumulating either in the spatial or frequency domain. For example, each selected block may be individually evaluated and all such blocks may be statistically accumulated. Other methods may also be advantageously employed, such as correlation. The selected characteristic may be luminance only, chrominance only, both luminance and chrominance, RGB and/or other characteristics associated with the constituent elements of the data set in question. Other modifications will no doubt occur to those of skill in this art, and all such modifications are deemed to fall within the scope and spirit of the present invention. Thus, the present invention to be limited only by the claims as set forth below.

What is claimed is:

1. A device (150) for detecting the watermark in a watermarked source data stream which includes a plurality of data elements, each data element having at least one characteristic associated therewith, wherein the watermark embedded in selected blocks of the source data stream meet a texture criterion measuring a variation of a selected characteristic associated with each data element of the source data stream, wherein the texture criterion is unrelated to any relationship between corresponding blocks of two different frames, the device comprising:

a buffer circuit (160) receiving as input the watermarked data stream, the buffer circuit buffering and dividing the watermarked data stream into the selected blocks, wherein the blocks are of the same size as chosen arbitrarily in the embedding process reflected in the watermarked source data stream (145);

a block selector circuit (120, 170) coupled to an output of the buffer circuit, the block selector circuit selecting blocks of the watermarked data stream based on a substantially similar texture criterion as that used in selecting the blocks for embedding the watermark, wherein the data input to the criterion function comes only from the block being tried for selection; and a detector circuit (180) coupled to an output of the block selector circuit, the detector circuit detecting the watermark only in the blocks selected by the block selector circuit, to decrease the time and number of operations necessary to process a given number of blocks.

2. The device of claim 1, wherein the block selector circuit evaluates the texture criterion in a spatial domain.

3. The device of claim 1, wherein the texture criterion used in the detecting device is identical to that used in watermark embedding.

4. The device of claim 1, wherein the block selector circuit is a same circuit as is used to select blocks in which to embed the watermark during an embedding process.

5. A device (110) for embedding a watermark in selected blocks of a source data stream having a plurality of data elements, wherein the selected blocks meet a texture criterion that measures a variation of a selected characteristic associated with each data element, wherein the texture criterion is unrelated to any relationship between corresponding blocks of two different frames of the source data stream, the device comprising:

a buffer circuit (115) for buffering and dividing the source data stream into a plurality of the selected blocks, wherein the block size is chosen arbitrarily with all blocks being of the same size;

a block selector circuit (120, 170) coupled to the buffer circuit, the block selector circuit selecting the blocks of the source data stream that meet a substantially similar texture criterion, wherein the data input to the criterion function comes only from the block being tried for selection; and an embedder circuit (130, 140) coupled to the block selector circuit and an output of the buffer circuit, the embedder circuit embedding the watermark only in the selected blocks of arbitrary size that meet said substantially similar texture criterion.

6. The device of claim 5, wherein the buffer circuit (115) and the block selector circuit (120, 170) each provide blocks to the embedder circuit, the embedder circuit being selectively disabled and enabled based upon an output of the block selector circuit for selecting.

7. The device of claim 5, wherein the buffer circuit (115) is connected to a first input of a logic device (140) and to an input of the block selector circuit (120, 170), the block selector circuit being connected to the embedder circuit whose output is connected to a second input of the logic device, the block selector circuit controlling an operation of the logic device to cause the logic device to selectively output blocks with and without watermarks.

8. The device of claim 7, wherein the logic device includes a multiplexer (140).

9. The device of claim 5, wherein the block selector circuit outputs a texture value to the embedding means, the embedding means modulating a strength of the watermark depending upon a magnitude of the texture value.

10. A method of detecting a watermark embedded in selected blocks of a watermarked data stream having a plurality of data elements, wherein the selected blocks meet a texture criterion that measures a variation of a selected characteristic associated with each data element of the watermarked data stream, wherein the texture criterion is unrelated to any relationship between corresponding blocks of two different frames, the method comprising:

dividing the watermarked data stream into a plurality of equally sized blocks as chosen arbitrarily in the embedding process reflected in the watermarked source data stream (145);

selecting only the blocks that meet substantially similar texture criterion as that used in selecting the blocks for embedding the watermark, wherein the data input to the criterion function comes only from the block being tried for selection; and detecting the watermark only in the blocks that were embedded with the watermark and were selected by the selecting step thereby decreasing the time and number of operations necessary to process a given number of blocks.

11. The method of claim 10, wherein the detecting involves calculating the average amplitude of corresponding data elements in the selected blocks in a spatial domain relative to a relatively uncorrelated data stream.

12. The method of claim 10, wherein the data stream is a video stream.

13. The method of claim 12 further characterized by preventing playback of the video stream when the watermark is not detected.

14. The method of claim 10, wherein the texture criterion used in the selecting of the selected blocks is identical to the texture criterion used in the watermark embedding.

15. A method of embedding a watermark in selected blocks of a source data stream having a plurality of data elements, wherein the selected blocks meet a texture criterion that measures a variation of a selected characteristic associated with each data element, wherein the texture criterion is unrelated to any relationship between corresponding blocks of two different frames of the source data stream, the method comprising:

buffering and dividing the source data stream into a plurality of the selected blocks, wherein the block size is chosen arbitrarily with all blocks being of the same size;

testing the blocks of arbitrarily chosen same size divided from the source data stream to determine if they meet substantially similar texture criterion, wherein the data input to the criterion function comes only from the block being tried for selection and once the texture criterion is met, embedding the watermark only in the selected blocks of arbitrarily chosen same size that meet said substantially similar texture criterion.

16. The method of claim 15, wherein the testing comprises:

subtracting a maximum value of the selected characteristic of the texture criterion from a minimum value of the selected characteristic of the texture criterion; and comparing an absolute value of a result of the subtraction with a given threshold value.

17. The method of claim 15, wherein the testing comprises:

generating a sum of absolute values of differences of the selected characteristic of the texture criterion; and comparing the sum of absolute values of differences with a given threshold value.

18. The method of claim 17, wherein the data elements are pixels, and the difference operations are performed on pairs of pixels having a separation, location and/or pattern which represents frequencies that best mask the watermark.

19. The method of claim 15, further characterized by de-emphasizing variations of the selected characteristic along edges of each block relative to variations of the selected characteristic within an interior of each block.

20. The method of claim 19, wherein the de-emphasizing is characterized by assigning a weighting coefficient to each data element within each block, data elements along edges of each block being assigned a lower coefficient than data elements within an interior of each block.

21. The method of claim 10 further characterized by:
    selecting only those blocks likely to include the watermark using the same texture criterion as was used in the watermark embedding process; and
    accumulating the selected blocks in a spatial domain to reinforce the watermark, if present, relative to a relatively uncorrelated data stream.

22. A method of embedding and detecting a watermark in selected blocks of a source data stream having a plurality of data elements, wherein the selected blocks meet a substantially similar texture criterion that measures a variation of a selected characteristic associated with each data element, wherein the texture criterion is unrelated to any relationship between corresponding blocks of two different frames of the source data stream, the method comprising:
    dividing the source data stream into the selected blocks of substantially similar texture criterion, wherein the selected blocks are divided into a block size which is chosen arbitrarily with all blocks being of the same size;
    selecting only the blocks that meet said substantially similar texture criterion, wherein the data input to the criterion function comes only from the block being tried for selection embedding the watermark only in the selected blocks that meet the substantially similar texture criterion;
    in the process of detecting, selecting the blocks of the watermarked source data stream based on the same substantially similar texture criterion as that used in selecting the same blocks for embedding the watermark, wherein the size of the blocks is the same as arbitrarily chosen in the embedding process; and
    detecting the watermark only in the selected blocks.

23. The device of claim 1, wherein the data input to the criterion function comes from multiple blocks in the same frame as the frame containing the block being tried for selection.

24. The device of claim 5, wherein the data input to the criterion function comes from multiple blocks in the same frame as the frame containing the block being tried for selection.

25. The device of claim 10, wherein the data input to the criterion function comes from multiple blocks in the same frame as the frame containing the block being tried for selection.

26. The device of claim 15, wherein the data input to the criterion function comes from multiple blocks in the same frame as the frame containing the block being tried for selection.

* * * * *